(12) United States Patent
Fujimoto (10) Patent No.: US 10,516,805 B2
(45) Date of Patent: Dec. 24, 2019

(54) THREE-DIMENSIONAL IMAGE FORMING WITH ADJUSTMENT OF GRAYSCALE IMAGE FOR THERMALLY EXPANDING SHEET TO SURFACE HEIGHT ACCORDING TO OUTLINE DENSITY

(71) Applicant: CASIO COMPUTER CO., LTD., Shibuya-ku, Tokyo (JP)

(72) Inventor: Hitomi Fujimoto, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 202 days.

(21) Appl. No.: 15/804,651

(22) Filed: Nov. 6, 2017

(65) Prior Publication Data

US 2018/0178543 A1 Jun. 28, 2018

(30) Foreign Application Priority Data

Dec. 26, 2016 (JP) ................................. 2016-251239

(51) Int. Cl.
*H04N 1/407* (2006.01)
*B32B 5/18* (2006.01)
(Continued)

(52) U.S. Cl.
CPC ............. *H04N 1/407* (2013.01); *B32B 5/18* (2013.01); *B32B 38/145* (2013.01);
(Continued)

(58) Field of Classification Search
None
See application file for complete search history.

(56) References Cited

U.S. PATENT DOCUMENTS 8,643,891 B2 * 2/2014 Fujita .................... G06K 15/186
264/132
8,643,898 B2 * 2/2014 Koyama ................. G06T 17/20
264/132
(Continued)

FOREIGN PATENT DOCUMENTS

JP 05344528 A 12/1993
JP 08118780 A 5/1996
(Continued)

OTHER PUBLICATIONS

Japanese Office Action (and English language translation thereof) dated Feb. 19, 2019 issued in Japanese Application No. 2016-251239.

*Primary Examiner* — Scott A Rogers
(74) *Attorney, Agent, or Firm* — Holtz, Holtz & Volek PC (57) ABSTRACT

A three-dimensional image forming system according to an embodiment of the present invention is a system that expands the front side of a thermally expandable sheet formed by laminating a thermally expanding layer on a base material and forms irregularities in a desired area, the system includes a print data density adjusting unit that adjusts, in print data for printing, on the back side of the thermally expandable sheet, a grayscale image for expanding the thermally expandable sheet to a surface height according to a density, the density of an outline part obtained by setting a region from a boundary between adjacent two regions having different densities in the grayscale image to a predetermined distance as the outline part in at least either of the two regions having different densities such that steep steps are formed on the front side of the thermally expandable sheet at the boundary.

17 Claims, 10 Drawing Sheets

(51) Int. Cl.
  _B32B 38/00_ (2006.01)
  _B41J 2/205_ (2006.01)
  _B41J 3/407_ (2006.01)
  _B41M 7/00_ (2006.01)
  _B41M 3/06_ (2006.01)
  _B41J 2/01_ (2006.01)
  _B29C 44/02_ (2006.01)
  _B29C 44/34_ (2006.01)

(52) U.S. Cl.
  CPC ............ _B41J 2/2056_ (2013.01); _B41J 3/407_ (2013.01); _B29C 44/022_ (2013.01); _B29C 44/3415_ (2013.01); _B41J 2/01_ (2013.01); _B41M 3/06_ (2013.01); _B41M 7/009_ (2013.01)

(56) References Cited

U.S. PATENT DOCUMENTS

| | | | |
|---|---|---|---|
| 8,643,899 B2 * | 2/2014 | Koyama | B41J 3/4073 |
| | | | 264/132 |
| 9,264,559 B2 * | 2/2016 | Motoyanagi | G06T 7/60 |

FOREIGN PATENT DOCUMENTS

| | | | | | |
|---|---|---|---|---|---|
| JP | 2001150812 A | | 6/2001 | | |
| JP | 2013132765 A | * | 7/2013 | ........... | B29C 44/022 |
| JP | 2015106318 A | | 6/2015 | | |
| JP | 2015147424 A | | 8/2015 | | |

* cited by examiner

THREE-DIMENSIONAL IMAGE FORMING WITH ADJUSTMENT OF GRAYSCALE IMAGE FOR THERMALLY EXPANDING SHEET TO SURFACE HEIGHT ACCORDING TO OUTLINE DENSITY

CROSS-REFERENCE TO RELATED APPLICATIONS

This application is based upon and claims the benefit of priority from the prior Japanese Patent Application No. 2016-251239, filed on Dec. 26, 2016, the entire contents of which are incorporated herein by reference.

BACKGROUND OF THE INVENTION

1. Field of the Invention

The present invention relates to a three-dimensional image forming system, a computer-readable recording medium, and a three-dimensional structure.

2. Description of the Related Art

There is known a technique for forming a three-dimensional image having irregularities on one surface of a thermally expandable sheet provided with a thermally expanding layer that expands by heat on one surface of a base material such as thick paper. More specifically, with black ink having high light absorbency, the pattern of the region to be protruded is printed on the surface on the thermally expanding layer side of the thermally expandable sheet (hereinafter, the front side of the thermally expandable sheet), or the mirrored pattern is printed on the surface on the base material side (hereinafter the back side of the thermally expandable sheet). By irradiating the printed surface with light such as near infrared rays, the black ink generates heat and expands the thermally expanding layer to a surface height according to the density of the black ink to form a three-dimensional image. In addition, by printing, on the front side of the thermally expandable sheet, a desired image pattern with color inks of cyan, magenta, and yellow which have substantially no light absorbency, it is possible to form a three-dimensional image having irregularities corresponding to the image pattern in desired colors (See, for example, JP 2001-150812 A).

SUMMARY OF THE INVENTION

A three-dimensional image forming system according to an embodiment of the present invention is a system that expands the front side of a thermally expandable sheet formed by laminating a thermally expanding layer on a base material and forms irregularities in a desired area, the system includes a print data density adjusting unit that adjusts, in print data for printing, on the back side of the thermally expandable sheet, a grayscale image for expanding the thermally expandable sheet to a surface height according to a density, the density of an outline part obtained by setting a region from a boundary between adjacent two regions having different densities in the grayscale image to a predetermined distance as the outline part in at least either of the two regions having different densities such that steep steps are formed on the front side of the thermally expandable sheet at the boundary.

A computer-readable recording medium according to an embodiment of the present invention is a non-transitory computer-readable recording medium that stores a program causing a computer for a three-dimensional image forming system to execute the following procedure of a print data density adjusting process for adjusting, in print data for printing, on the back side of a thermally expandable sheet formed by laminating a thermally expanding layer on a base material, a grayscale image for expanding the thermally expandable sheet to a surface height according to a density, the density of an outline part obtained by setting a region from a boundary between adjacent two regions having different densities in the grayscale image to a predetermined distance as the outline part in at least either of the two regions having different densities such that steep steps are formed on the front side of the thermally expandable sheet at the boundary.

A three-dimensional structure according to an embodiment of the present invention is a three-dimensional structure formed by laminating a foaming layer having irregularities on the front side on a base material, on the back side of which a grayscale image containing a photothermal conversion component that converts absorbed light into heat is formed, in which, in the grayscale image, an outline part having a range from a boundary to a predetermined distance has a photothermal conversion component density different from the outside of the outline part in at least either of two regions setting a steep step on the surface as the boundary, and the outline part in a region on a high surface height side has a higher density.

BRIEF DESCRIPTION OF THE DRAWINGS

FIGS. 2A, 2B, and 2C are cross sectional views schematically explaining a structure of a thermally expandable sheet and a method for producing a three-dimensional image; FIG. 2A is a thermally expandable sheet, FIG. 2C is a three-dimensional image;

FIGS. 10A and 10B are diagrams for explaining an appearance of a three-dimensional image according to an embodiment.

DETAILED DESCRIPTION OF THE PREFERRED EMBODIMENTS

Hereinafter, an embodiment for carrying out the present invention will be described in detail with reference to the drawings. However, the following embodiment is an example of a three-dimensional image forming system for embodying a technical idea of the present embodiment, and the present invention is not limited thereto. In order to clarify the description, the sizes, the positional relations, the densities and the like of a thermally expandable sheet which is a printing material and a produced three-dimensional image shown in the drawings can be emphasized, and the shapes can be simplified. In this specification, a three-dimensional image is a sheet-like printed material having irregularities on the surface of one side by being partially thickened, and further includes the printed material having colors on the surface of the one side. In the following description, the same or equivalent members and processes are denoted by the same reference signs, and the description thereof is appropriately omitted.

[Stereoscopic Image Forming System]

Figure 1:
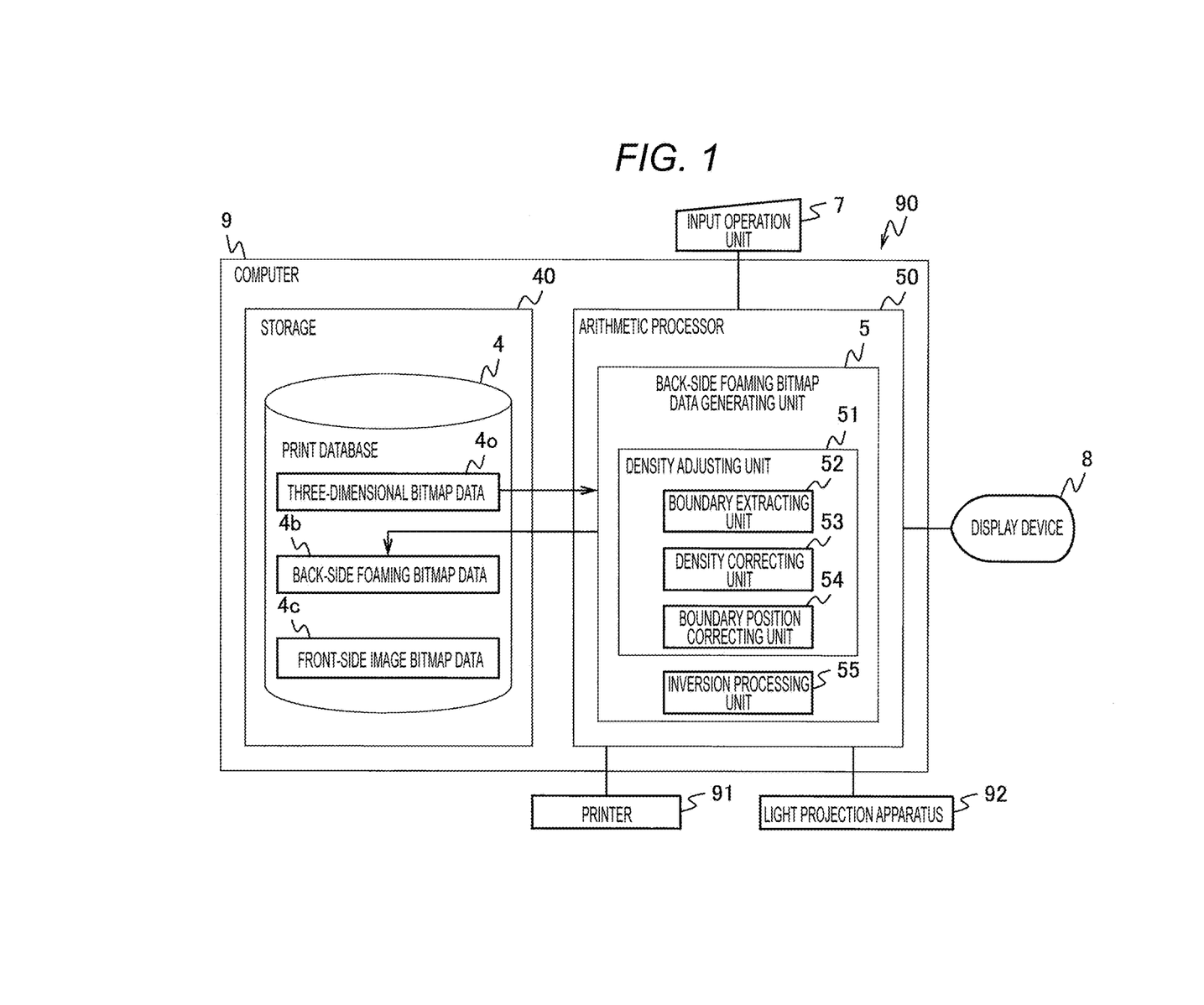
FIG. 1 is a block diagram showing a configuration of a three-dimensional image forming system according to an embodiment.

A configuration of a three-dimensional image forming system according to an embodiment of the present invention will be described with reference to FIG. 1. FIG. 1 is a block diagram showing a configuration of a three-dimensional image forming system according to an embodiment of the present invention. In the present specification, a three-dimensional image forming system is for forming a three-dimensional image using, as a printing medium, a thermally expandable sheet in which a thermally expanding layer that is heated and expanded is formed on one side of a base material such as paper so as to have a certain thickness. A three-dimensional image forming system 90 includes a computer 9, an input operation unit 7, a display device 8, a printer 91, and a light projecting apparatus 92.

The computer 9 is, for example, a personal computer, includes an arithmetic processor 50 and a storage 40, and is communicably connected to the input operation unit 7, the display device 8, the printer 91, and the light projecting apparatus 92 by a communication cable or the like. The input operation unit 7 and the display device 8 are, for example, an integrated touch panel display, or the input operation unit 7 may be a keyboard or a mouse, and the display device 8 may be a simple display.

The arithmetic processor 50 is a central processing unit (CPU), and includes a back-side foaming bitmap data generating unit 5. The storage 40 is a random access memory (RAM), a read only memory (ROM), a hard disk drive (HDD), or the like, and is not limited to the one embedded in the computer 9, and may include an external HDD connected by a communication cable or the like. The storage 40 stores a database such as a print database 4, a program for causing the printer 91 to perform printing, a program for causing the light projecting apparatus 92 to project near-infrared rays, a program for implementing the back-side foaming bitmap data generating unit 5 (not shown), and the like. The print database 4 stores bitmap data, such as back-side foaming bitmap data 4b and front-side image bitmap data 4c, for the printer 91 to print an image on a thermally expandable sheet.

The printer 91 is, for example, an ink jet printer, and has functions of printing a gray scale image on a thermally expandable sheet with carbon black ink, and of printing a color image on a thermally expandable sheet with color ink.

The light projecting apparatus 92 projects light to a thermally expandable sheet, and a known apparatus for forming a three-dimensional image with a thermally expandable sheet is applicable. Specifically, the light projecting apparatus 92 mainly includes a transport mechanism that transports a thermally expandable sheet in one direction like the printer 91, a light source that emits light including near-infrared rays, a reflector, and a cooler that cools the light projecting apparatus. The light source is, for example, a halogen lamp, and is provided over the full width of the thermally expandable sheet. In order to project light efficiently from the light source to the thermally expandable sheet, the reflector is formed on a curved surface of a substantially semicircular column having a cylindrical shape, has a mirror surface on the inner side, and covers the opposite side to the side of the light source that faces the thermally expandable sheet. The cooler is an air-cooling type fan, a water-cooling type radiator, or the like, and is provided in the vicinity of the reflector.

(Back-Side Foaming Bitmap Data Generating unit)

The back-side foaming bitmap data generating unit 5 includes a density adjusting unit 51 and an inversion processing unit 55. The density adjusting unit 51 includes a boundary extracting unit 52, a density correcting unit 53, and a boundary position correcting unit 54. The back-side foaming bitmap data generating unit 5 receives, from the print database 4 or the outside of the three-dimensional image forming system 90, three-dimensional bitmap data 4o which is height information on the irregularities to be formed on the surface of the three-dimensional image, and generates and outputs back-side foaming bitmap data 4b for printing. The detailed operation of the back-side foaming bitmap data generating unit 5 will be described later.

(Thermally Expandable Sheet)

Figure 2A:
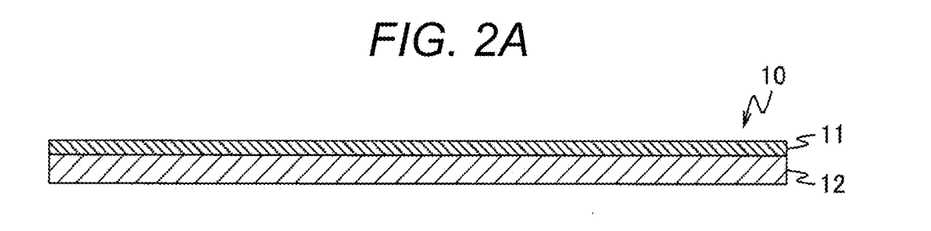

Here, a thermally expandable sheet as a medium in the three-dimensional image forming system 90 will be described with reference to FIG. 2A. FIG. 2A is a cross sectional view schematically explaining a structure of a thermally expandable sheet. A thermally expandable sheet 10 includes a base material 12 and a thermally expanding layer 11 formed on one surface (front side) of the base material 12 so as to have an even thickness. The thermally expandable sheet 10 is, for example, a rectangle of A4 paper size and has a shape in which one of the corners is obliquely cut out to identify the direction. The thermally expanding layer 11 contains thermally expandable microcapsules using a thermoplastic resin as a binder, and contains white pigment such as titanium oxide to make the ground color (background color) white as required. The microcapsule is formed of a thermoplastic resin, contains a volatile solvent, and expands to a size corresponding to the heating temperature and heating time when being heated to the temperature about 80° C. or higher, which depends on the expansion temperature range, that is, the types of the thermoplastic resin and the volatile solvent. Thus, the thermally expanding layer 11 can be expanded up to about 10 times thicker than the layer before expansion. The base material 12 has a strength that does not cause wrinkles or large waviness when the thermally expanding layer 11 is partially expanded, and is made of, for example, thick paper since it is preferable that the thickness is thin enough to have the strength so that the thermal conductivity in the thickness direction is to be high as much as possible.

By depositing, on a desired region on the front side or the back side of the thermally expandable sheet 10, a heat generating component that absorbs light in a specific wavelength range, for example, near infrared rays (wavelength 780 nm to 2.5 μm), converts the light into heat, and releases the heat, and projecting the near infrared rays to the entire surface, it is possible to expand the thermally expanding layer to the thickness corresponding to the depositing amount only within the region to form a three-dimensional image. As the heat generating component, black (K) ink for general printing containing carbon black can be used. That is, as to be described later, the printer 91 of the three-dimensional image forming system 90 prints a grayscale image on at least one side of the thermally expandable sheet 10 with black ink. Then, the light projecting apparatus 92 projects the near infrared rays to the entire surface, on which the grayscale image is printed, of the thermally expandable sheet 10. A three-dimensional image in which the thermally expanding layer 11 is partially expanded and the surface is raised is thereby formed. In the embodiment of the present invention, a grayscale image is formed on the surface on the base material 12 side (back side) of the thermally expandable sheet 10 and irradiated with near infrared rays.

(Method for Producing Three-Dimensional Image)

Figure 2B:
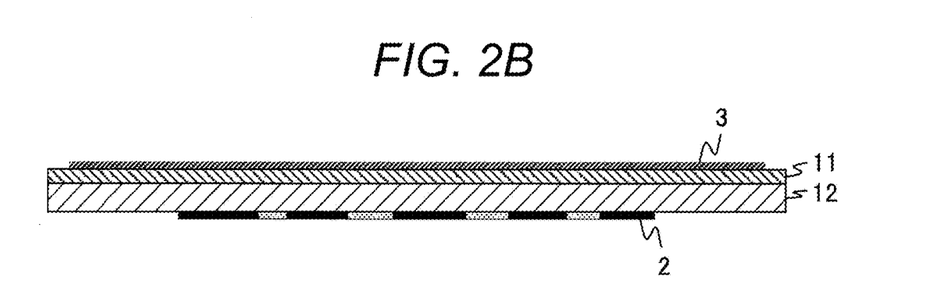
FIG. 2B is a thermally expandable sheet on each side of which a color image and a grayscale image are printed.
Figure 2C:
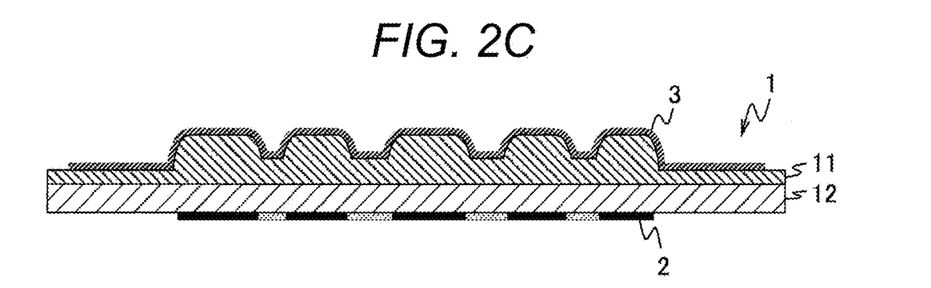

A method for producing a three-dimensional image by the three-dimensional image forming system 90 will be described with reference to FIGS. 2B and 2C. FIG. 2B is a thermally expandable sheet on each side of which a color image and a grayscale image are printed, and FIG. 2C is a three-dimensional image. The printer 91 prints the back-side foaming bitmap data 4b on the back side of the thermally expandable sheet 10 to form the grayscale image 2 with the black ink. Next, the light projecting apparatus 92 projects near infrared rays to the back side of the thermally expandable sheet 10 to expand the thermally expanding layer 11 of the thermally expandable sheet 10, whereby a three-dimensional image 1 is obtained. By forming a color image 3 on the front side of the thermally expandable sheet 10 with color ink before projecting near infrared rays, it is also possible to produce a three-dimensional image 1 with the image on its surface. The color image 3 can be formed, similarly to the grayscale image 2, by printing the front-side image bitmap data 4c (see FIG. 1), which is the print data of the color image 3, by the printer 91. The printing order of the grayscale image 2 and the color image 3 is not defined.

[Method for Generating Back-Side Foaming Bitmap Data]

Figure 3A:
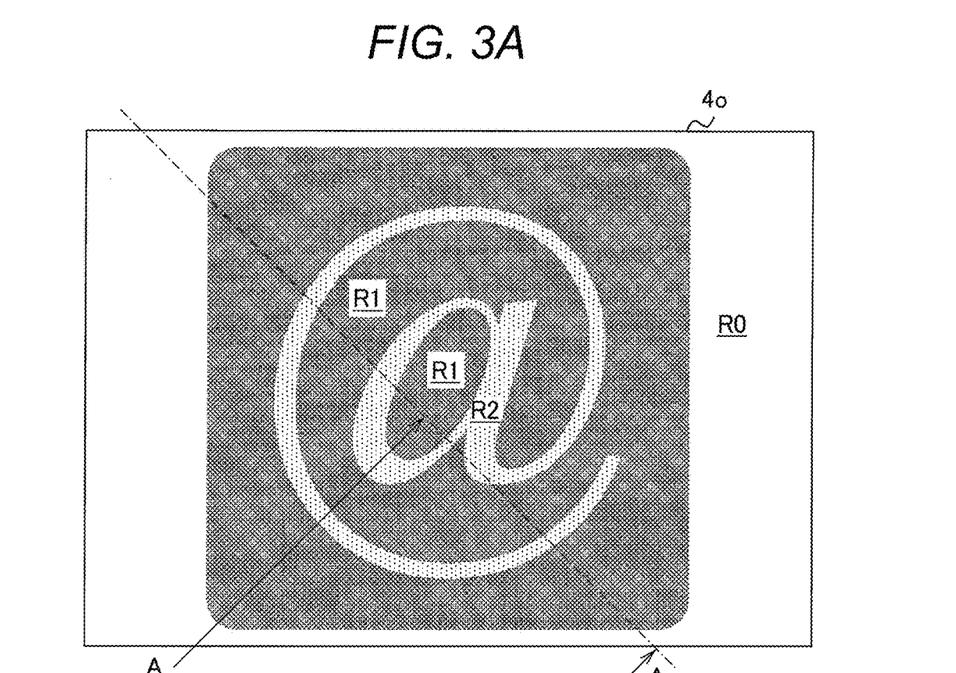
FIG. 3A is an appearance diagram of two-dimensional data in which the expansion height of the front side of the thermally expandable sheet is expressed by a photothermal conversion component density printed on the back side and expanded to the height.
Figure 3B:
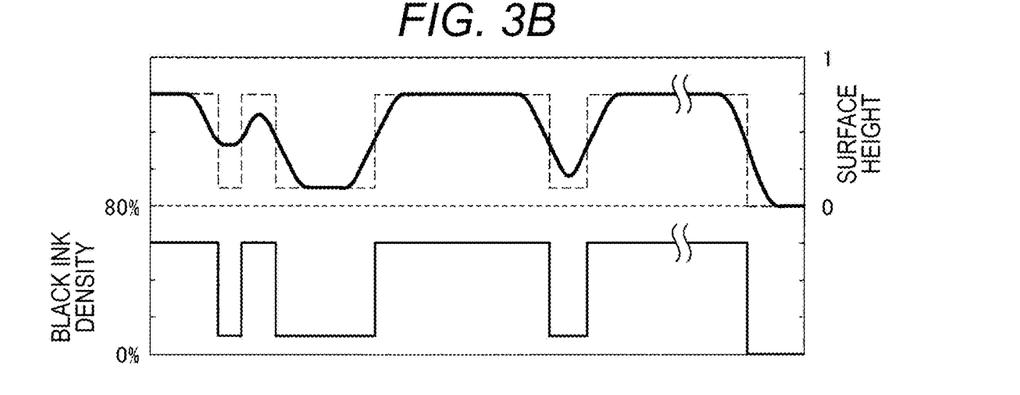
FIG. 3B is a graph showing the photothermal conversion component density and the surface height of a grayscale image at the cross section of a three-dimensional image in which the grayscale image is printed on the back side based on the two-dimensional data shown in FIG. 3A, and corresponds to the cross section of the portion A-A of FIG. 3A.

The back-side foaming bitmap data 4b which is the print data of the grayscale image 2 and the method for generating the data will be described. The back-side foaming bitmap data 4b is for printing the grayscale image 2 on a gray scale on the back side of the thermally expandable sheet 10 with a single color of black ink (photothermal conversion component). Such back-side foaming bitmap data 4b is created based on the three-dimensional bitmap data 4o which is two-dimensional data of the height information on the irregularities to be formed on the surface of the three-dimensional image. First, the three-dimensional bitmap data 4o will be described with reference to FIGS. 3A, 3B and 3C. FIG. 3A is an appearance diagram of two-dimensional data in which the expansion height of the front side of the thermally expandable sheet is expressed by the density of black ink printed on the back side and expanded to the height. FIG. 3B is a graph showing the photothermal conversion component density and the surface height of the grayscale image at the cross section of the three-dimensional image in which the grayscale image is printed on the back side according to the two-dimensional data shown in FIG. 3A, and corresponds to the cross section of the portion A-A of FIG. 3A. In FIG. 3B, the cross section of the three-dimensional image is enlarged and emphasized in the height direction.

As shown in FIG. 3A, the three-dimensional bitmap data 4o is two-dimensional data expressed by white to black grayscale, in which a large square (rounded rectangle) is drawn in gray at the center, the letter of an at-sign "@" is drawn in relatively light gray inside the square, and the background is white. More specifically, the inner region R1 of the square is black (K60) at a density of 60%, the letter region R2 is black (K10) at a density of 10%, and the white of the background (region R0) is black (K0) at a density of 0%. In the three-dimensional bitmap data 4o, the expansion height information is expressed by the density of black ink (hereinafter, referred to as a black density) which is printed on the back side of the thermally expandable sheet 10 and is expanded to the height. Thus, as the surface is higher, the data is expressed in a higher density, that is, darker. Here, the black density for expanding the thermally expanding layer 11 of the thermally expandable sheet 10 to the maximum height by the three-dimensional image forming system 90 is K80. The density is set because, in the three-dimensional image forming system 90, that the thermally expanding layer 11 does not expand further if the black density on the back side of the thermally expandable sheet 10 is K80 or higher, that it is difficult to ensure safety if the generated heat temperature is excessively high, and the like. The white ink (K0) does not contain black ink at all, and the thermally expanding layer 11 does not expand. Thus, the expansion height is zero which is the minimum, that is, the height of the surface of the thermally expandable sheet 10 before expansion. Thus, in the three-dimensional image obtained by the three-dimensional bitmap data 4o in design, the surface is raised to a height of 75% of the maximum expansion height (surface height: 1 in FIG. 3B) in a square shape, and a groove having a bottom height of 12.5% is formed in the shape of the letter of the at-sign "@" inside the square, and the surface has the irregularities in the cross section as shown by the broken line in FIG. 3B. In an actual three-dimensional image, the relation between the black density of the grayscale image 2 and the expansion height of the thermally expanding layer 11 is not necessarily linear.

Figure 4:
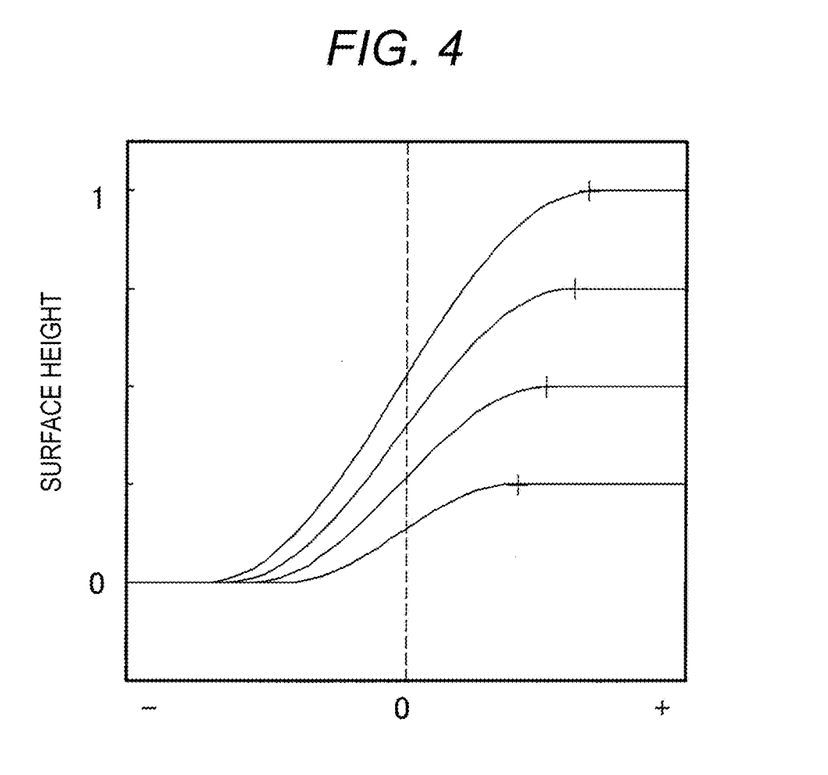
FIG. 4 is a graph showing changes in the surface height of a three-dimensional image in which a uniform pattern of the photothermal conversion component density is printed on the back side of the thermally expandable sheet.

Here, the expansion of the thermally expanding layer 11 based on the grayscale image 2 formed on the surface on the base material 12 side (back side) of the thermally expandable sheet 10 will be described with reference to FIG. 4. FIG. 4 is a graph showing changes in the surface height of a three-dimensional image in which a uniform pattern of the black ink density (photothermal conversion component density). When the grayscale image 2 (black ink deposited to the back side) is irradiated with near infrared rays and generates heat, the heat propagates through the base material 12 to the thermally expanding layer 11. However, the heat released from the grayscale image 2 propagates not only in the thickness direction of the thermally expandable sheet 10 but also in the plane direction. For this reason, regardless of the white region (low density area) where the black ink is not deposited to the back side, the heat diffuses in the vicinity of the boundary with the gray to black region (high density region). Accordingly, all the heat of the black ink in the high density region is not propagated in the vicinity of the boundary despite the high density area. As a result, as shown in FIG. 4, the surface of the three-dimensional image (the thermally expanding layer 11 after expansion) in the vicinity of the boundary (0) between the low density region (−) and the high density region (+) has an inclination interposing the boundary, and reaches a surface height according to the density of the black ink at a certain distance from the boundary in the high density region (the right side of the position marked by the cross "+" in FIG. 4). On the other hand, in the low density region, the influence of the heat of the black ink in the high density region is greater as the position is closer to the boundary, that is, the surface reaches the surface height according to the density of the black ink at a certain distance from the boundary similarly to the high density region. As the height to which the sheet is to be expanded is higher and the density of the black ink in the high density region is higher, that is, as the density difference between the two regions is larger, the thermally expanding layer 11 expands widely from the boundary to the low density region side, and the distance from the boundary to the maximum height in the high density region is long, but the angle of the inclined surface is closer to the vertical.

Due to such phenomena, if the data in which the expansion height information of the three-dimensional bitmap data 4o is mirrored as the density of the black ink is printed on the back side of the thermally expandable sheet 10 and irradiated with near infrared rays to form the three-dimensional image, the raised part from the background (region R0) of the square region R1 and the grooves in the shape of the letter (region R2) inside the raised part all have shapes in which the steps are gently inclined and the rising and falling are unclear. The groove in the region R2 has a shallow groove depth (high bottom) at a narrow line width, and the protruding narrow part sandwiched between the grooves in the region R1 is recessed lower than the periphery. Such a three-dimensional image is formed to have the surface with the irregularities in the cross section as shown by the solid line in FIG. 3B. As a result, unless a color image is not added to the surface of the three-dimensional image, the three-dimensional image has the appearance in which the outlines are entirely blurred, and a narrow part of the line width of the letter and a narrow part between the lines of the letter are more blurred. That is, it is unclear whether there is a difference in height at the position in the appearance. In addition, it is difficult to distinguish the protruding or recessed position and shape by the touch of the surface.

Figure 5:
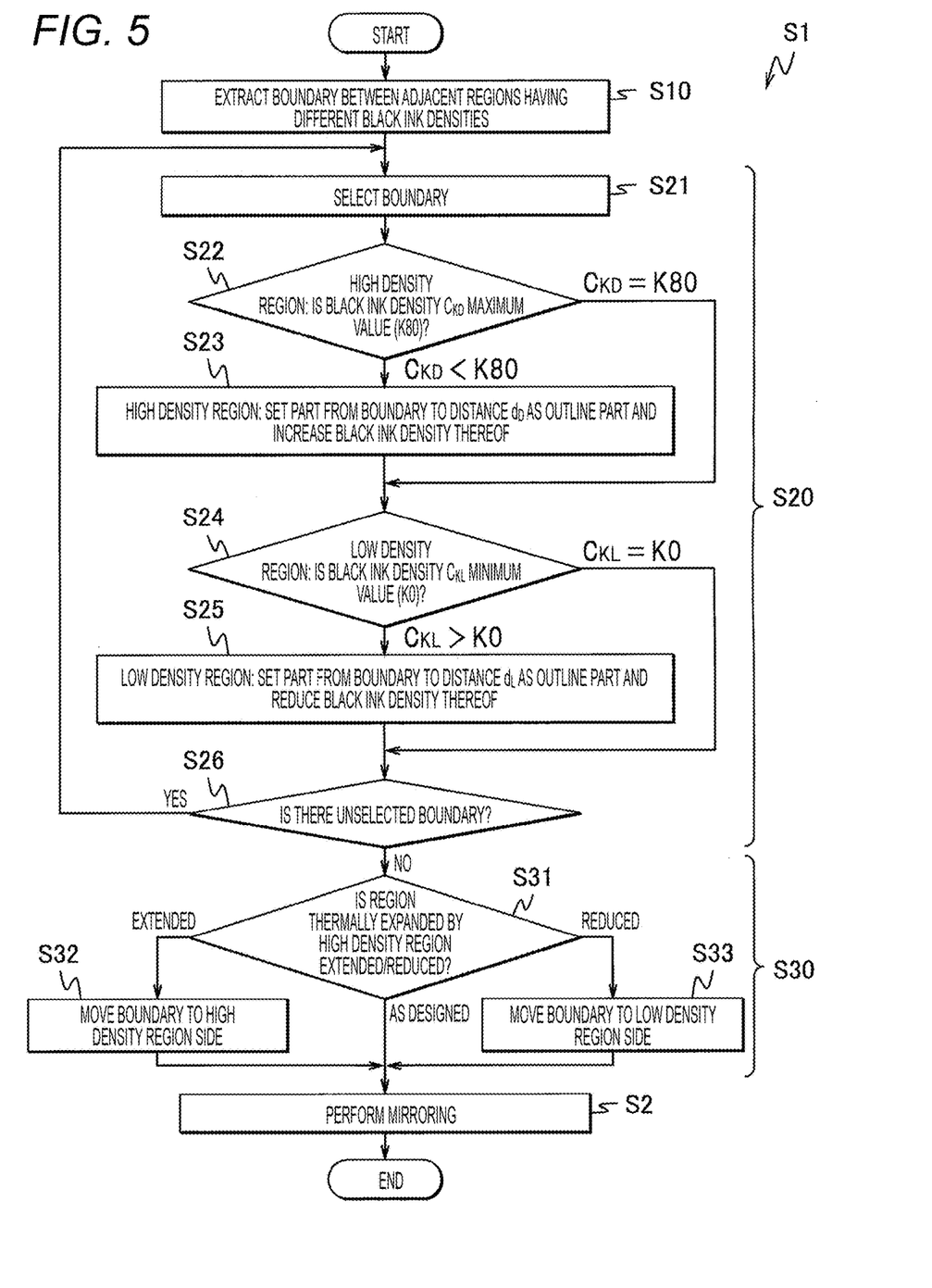
FIG. 5 is a flowchart for explaining a procedure for generating print data of a grayscale image.
Figure 6:
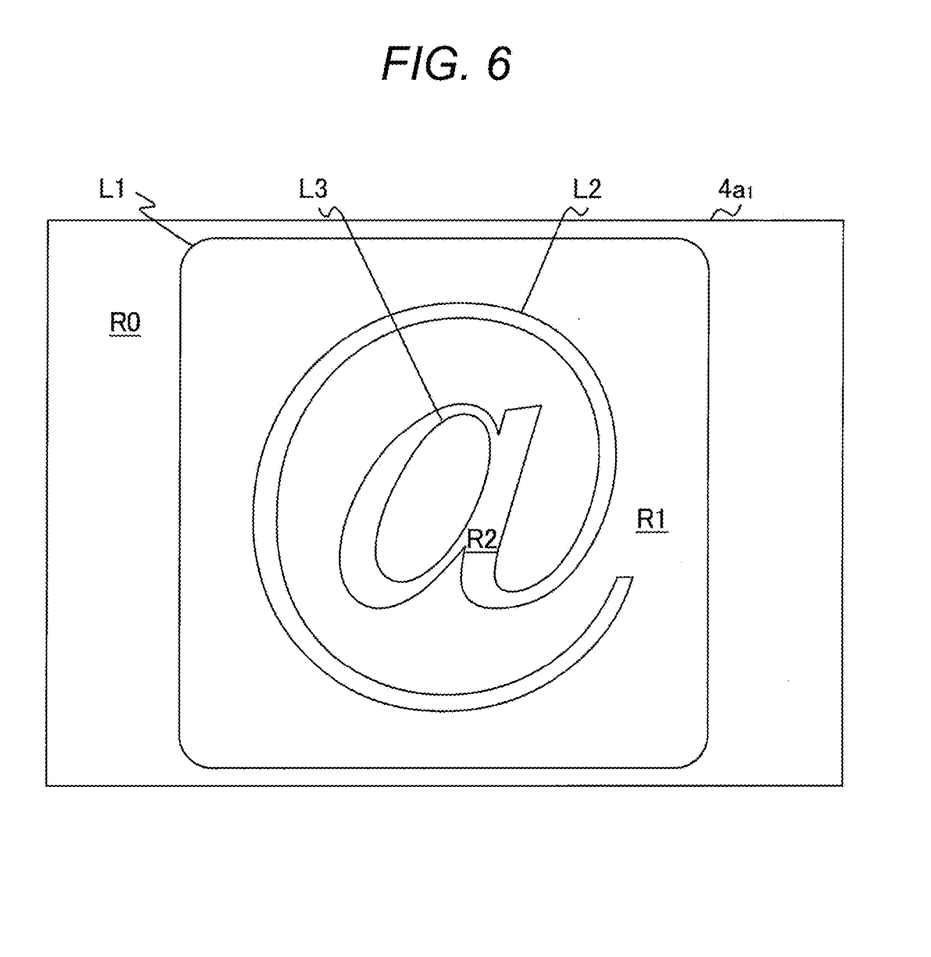
FIG. 6 is an appearance diagram of boundaries extracted from the two-dimensional data shown in FIG. 3A.
Figure 7:
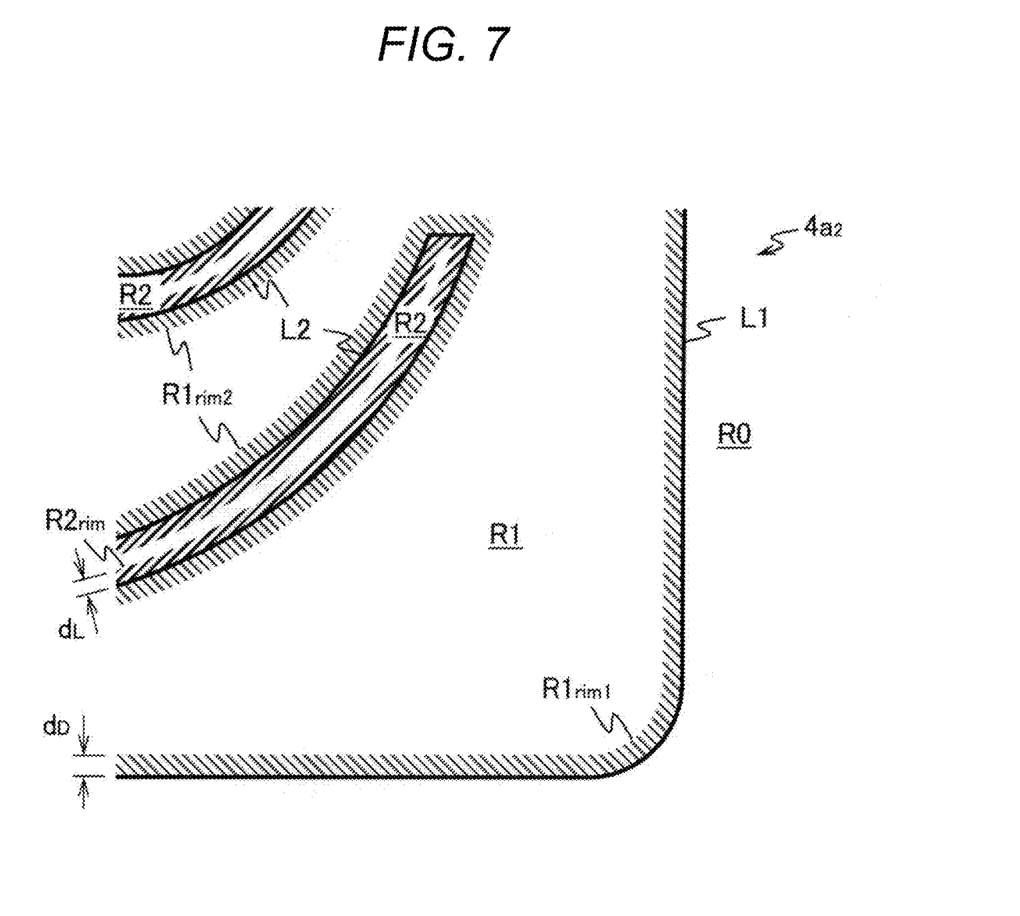
FIG. 7 is a schematic diagram for explaining correction of photothermal conversion component densities of outline parts along the boundaries and corresponds to a partial enlarged view of the two-dimensional data shown in FIG. 3A.
Figure 8:
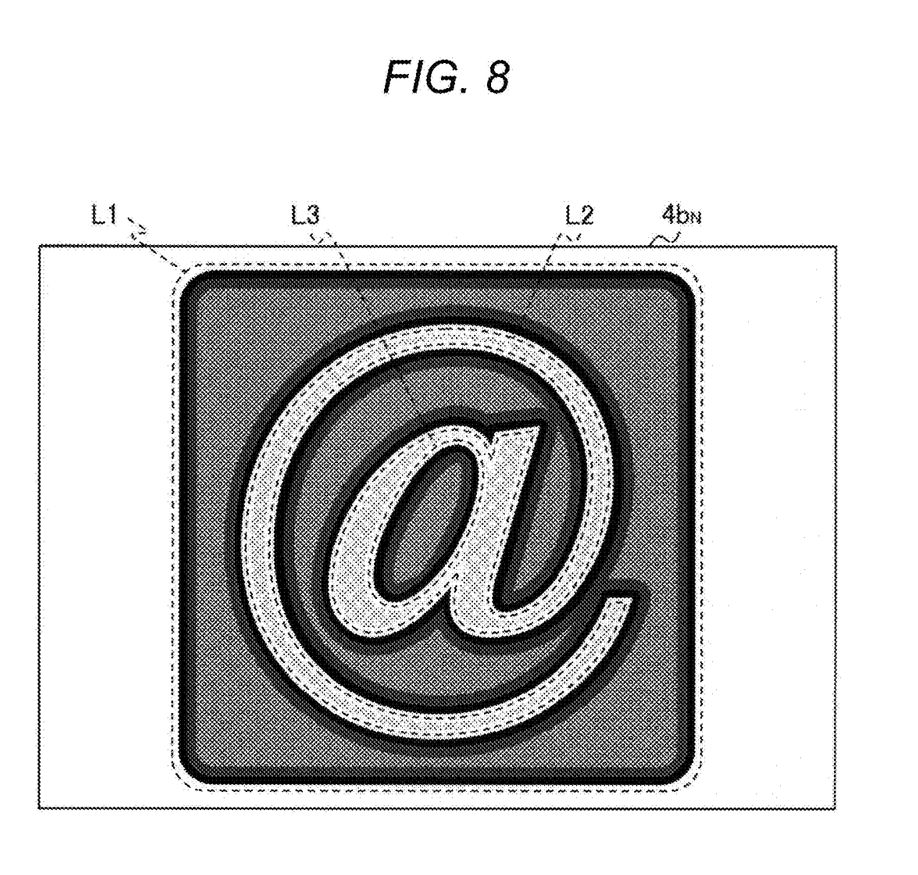
FIG. 8 is an appearance diagram of data obtained by adjusting the photothermal conversion component density of the two-dimensional data shown in FIG. 3A.
Figure 9:
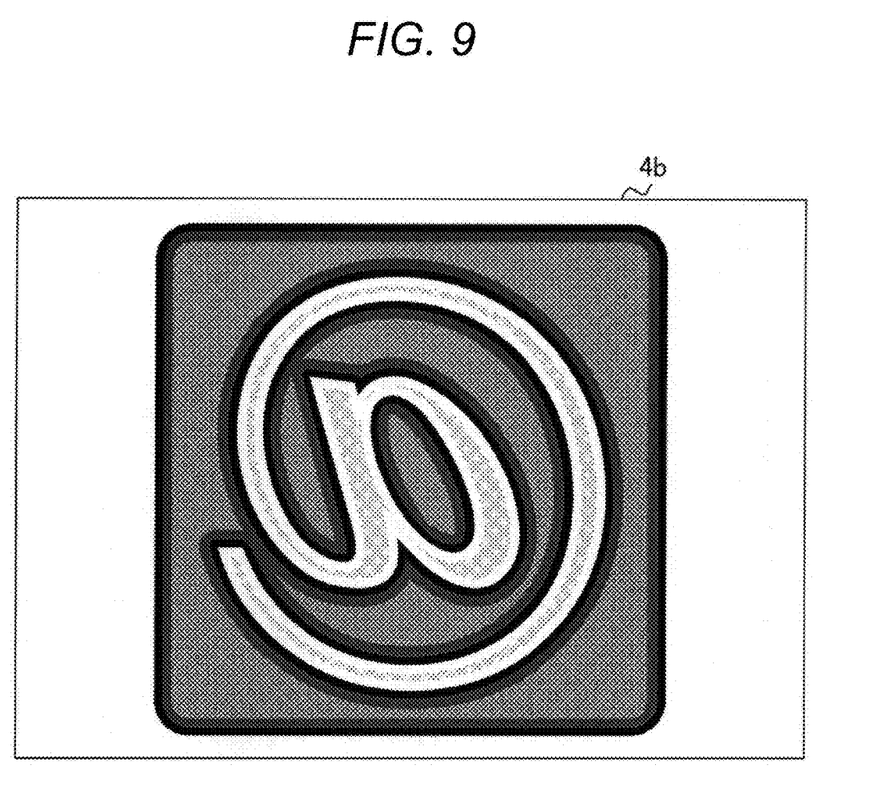
FIG. 9 is an appearance diagram of two-dimensional pattern data of the density distribution of the photothermal conversion component according to an embodiment, and is print data obtained by mirroring the data shown in FIG. 8.

Thus, the back-side foaming bitmap data generating unit 5 generates the back-side foaming bitmap data 4b, which is the print data of the grayscale image 2 to be formed on the back side of the thermally expandable sheet 10, based on the three-dimensional bitmap data 4o. Hereinafter, a method for generating print data of a grayscale image will be described with reference to FIGS. 5 to 9. FIG. 5 is a flowchart for explaining a procedure for generating print data of a grayscale image. FIG. 6 is an appearance diagram of boundaries extracted from the two-dimensional data shown in FIG. 3A. FIG. 7 is a schematic diagram for explaining correction of the photothermal conversion component density in outline parts along the boundaries and corresponds to a partial enlarged view of the two-dimensional data shown in FIG. 3A. FIG. 8 is an appearance diagram of data obtained by adjusting the photothermal conversion component density of the two-dimensional data shown in FIG. 3A. FIG. 9 is an appearance diagram of two-dimensional pattern data of the density distribution of the photothermal conversion component according to the embodiment, and is print data obtained by mirroring the data shown in FIG. 8.

As shown in FIG. 5, the back-side foaming bitmap data 4b is generated through a density adjusting step S1 in which the black ink density at an outline part having a certain width along the boundary between the adjacent regions having different black ink densities in the three-dimensional bitmap data 4o, and a mirroring step S2 in which the pattern obtained in the density adjusting step S1 is mirrored. The density adjusting step Si includes a boundary extracting step S10 in which the boundary between the adjacent regions having different black ink densities is extracted, an outline density correcting step S20 in which an outline part the black density of which is changed is formed in each of the two regions along the boundary between the two regions, and a boundary correcting step S30 in which the boundary position is moved to the high density region side or the low density region side as required.

(Density Adjusting Step)

In the boundary extracting step S10, the boundary extracting unit 52 extracts boundaries between regions having different black densities from the three-dimensional bitmap data 4o. As shown in FIG. 6 as data $4a_1$, the boundary (outline of the square) L1 between the region R0 (background) and the region R1 (square), the boundaries L2 (outside) and L3 (inside) between the region R1 and the region R2 (letter) are extracted.

Next, in the outline density correcting step S20, the density correcting unit 53 changes the density of the outline part (edge) having a predetermined width along the boundary so as to increase the black density difference between both sides and the vicinity of the boundary for each boundary of the data $4a_1$. First, the boundary L1 is selected (S21), and the density inside the square (region R1) on the high density side of the boundary L1 is changed, that is, the density of the outline part is increased. However, when the black density $C_{KD}$ of the region R1 is the maximum K80 (S22: $C_{KD}$=K80), the density cannot be further increased, and the step S23 is not performed, that is, the outline part is not provided. Since the black density $C_{KD}$ of the region R1 is K60 (S22: $C_{KD}$<K80), by setting the part from the boundary L1 to the distance $d_D$ as the outline part $R1_{rim1}$ (hatched region in FIG. 7) of the region R1, the density of the outline part $R1_{rim1}$ is changed to be higher than the original density $C_{KD}$ (S23). Here, as described with reference to FIG. 4, the step becomes steep as the density difference between both sides of the boundary is larger. Thus, here, the black density of the outline part $R1_{rim1}$ is changed to the maximum value K80. The width $d_D$ of the outline part $R1_{rim1}$ is set based on the distance until the height reaches the expansion height corresponding to the black density $C_{KD}$ (K60) of the region R1 due to the black density (K80) of the outline part $R1_{rim1}$. Alternatively, the black density of the outline part may be the fixed maximum value (K80), or the upper limit of the increase width (point) with respect to the original density $C_{KD}$ may be set in advance. In the region R0 (background) on the low density side, since the black density $C_{KL}$ is the minimum value K0 (white) (S24: $C_{KL}$=K0), the process S25 is not performed and an outline part is not provided in the region R0.

The boundary L2 (outline of the letter) is selected (S21), an outline part $R1_{rim2}$ having the width $d_D$ is provided similarly to the boundary L1 in the region R1 on the high density side, and the density of the outline part $R1_{rim2}$ is changed to the black density K80 (step S23). On the other hand, since the black density $C_{KL}$ of the letter (region R2) on the low density side is K10 (S24: $C_{KL}$>K0), by setting the part from the boundary L2 to the distance $d_L$ as an outline part $R2_{rim}$ of the region R2, the density of the outline part $R2_{rim}$ is changed to be lower than the original density $C_{KL}$, (S25). In this case, the outline part $R2_{rim}$ is changed to the minimum value K0 (white). The width $d_L$ of the outline part $R2_{rim}$ is set based on the black density of the outline part $R2_{rim}$ and the original density $C_{KL}$ similarly to the width $d_D$ on the high density side. The black density of the outline part may be the fixed minimum value (K0), or the upper limit of the reduction width (point) with respect to the original density $C_{KL}$ or the difference of the black density from that of the outline part on the high density side of the boundary may be set in advance. Then, the boundary L3 is selected (S21), and steps S22 to S25 are performed similarly. When the steps are performed to all the boundaries L1, L2 and L3 (S26: NO), the outline density correcting step S20 is finished, and data $4a_2$ is obtained.

The outline part $R1_{rim1}$ and the outline part $R1_{rim2}$ of the region R1 are not necessarily the same black density or width $d_D$, and may be set to different values according to, for example, the black densities $C_{KL}$ of the adjacent regions R0 and R2 or the difference of the black density from that of the outline part $R2_{rim}$. The black density of each outline part may not be uniform, and may vary according to the distance from the boundary. In particular, in the region R1 on the high density side of the boundaries L1, L2, and L3, the difference of the black density of the outline parts $R1_{rim1}$ and $R1_{rim2}$ from that of the original density $C_{KD}$ is 20 points which is large. Thus, the expansion height is lowered once at the switching position of the outline part $R1_{rim}$ and the original density, and a small step or groove can be caused. For this reason, the outline parts $R1_{rim1}$ and $R1_{rim2}$ are divided into widths $d_{D1}$ and $d_{D2}$ ($d_{D1}+d_{D2} \geq d_D$) in order from the boundary side, and the respective black densities are set to K80 and K70. In this manner, by gradually increasing the densities of the outline parts $R1_{rim1}$ and $R1_{rim2}$ from the original black density $C_{KD}$ of the region R1, it is possible for the step to be close to the vertical without causing a groove or the like. Also in the region on the low density side, the density may be gradually reduced depending on the difference between the original density $C_{KL}$ and the density of the outline part. The densities of the outline parts may be divided into three or more, or may be a gradation which is continuously changed without changing the densities distinctly.

In the boundary correcting step S30, the boundary position correcting unit 54 moves the boundary together with the outline part as required based on the density differences (change amount) $\Delta C_{KD}$ and $\Delta C_{KL}$ of the outline part in the vicinity of the boundary from the original black densities $C_{KD}$ and $C_{KL}$ (of the three-dimensional bitmap data $4o$) in the data $4a_2$. For example, with regard to the boundary L1, by increasing the black density of the outline part $R1_{rim1}$ in the inner region R1 on the high density side from K60 to K80, the region to be thermally expanded is extended to the outside (region R0 (background) side) of the boundary L1 (See FIG. 4). In this case, the size of the square which is the outer shape of the region R1 is larger than the design in the appearance of the obtained three-dimensional image. Thus, the boundary L1 is moved to the region R1 side together with the outline part $R1_{rim1}$ by a predetermined distance, that is, the square is slightly reduced in size.

Similarly, with regard to the boundaries L2 and L3, by providing the outline part $R1_{rim2}$ having an increased density in the outer region R1, the region R1 is extended, that is, the width of the inner region R2 (letter) is to be narrowed. On the other hand, with regard to the boundaries L2 and L3, by providing the outline part $R2_{rim}$ in which the black density is reduced from K10 to K0 in the region R2 on the low density side, the region R2 is extended and widened, that is, the region R1 is to be reduced. Thus, with regard to the two regions R1 and R2 sandwiching the boundaries L2 and L3, it is predicted which region R1 or R2 to be expanded to the expansion height is to be extended (S31), and the boundaries L2 and L3 are moved, based on the result, together with the adjacent outline parts $R1_{rim2}$ and $R2_{rim}$ to the region R1 side or the region R2 side (S32, S33), or the boundaries L2 and L3 are not moved. As an example, with regard to the boundary L2, by comparing the density difference $\Delta C_{KD}$ of the outline part $R1_{rim2}$ with respect to the density $C_{KD}$ of the region R1 on the high density side with the density difference $\Delta C_{KL}$ of the outline part $R2_{rim}$ to with respect the density $C_{KL}$ of the region R2 on the low density side, it is determined that the region having the larger difference is to be extended. In this case, since the change amount in the region R1 is 20 points and the change amount in the region R2 is 10 points, the region R1 is larger, and the boundary L2 is moved to the region R1 side. The movement distance of the boundary L2 is further calculated based on the difference of the change amount. With the series of density adjusting step S1, normal image foaming bitmap data $4b_N$ shown in FIG. 8 is generated. In FIG. 8, the boundaries L1, L2, and L3 before movement are indicated by dotted lines.

In the outline density correcting step S20, the steps S22 to S23 and the steps S24 to S25 may be performed reversely or in parallel. In the boundary correcting step S30, instead of performing determination by prediction (S31), the boundaries may be moved to the high density region side and the low density region side by the distance based on the density change amounts $\Delta C_{KD}$ and $\Delta C_{KL}$ of the outline parts in the two regions (S32, S33). Furthermore, each time one boundary is selected (S21) in the outline density correcting step S20, steps S22 to S25 and the boundary correcting step S30 (S31 to S33) may be successively performed. In this case, when the outline part is provided (S23, S25), the boundary may be moved by the distance based on the density change amounts $\Delta C_{KD}$ and $\Delta C_{KL}$ (S32, S33).

As shown in FIG. 8, the normal image foaming bitmap data $4b_N$ is, in addition to the black density corresponding to the expansion height of the three-dimensional bitmap data $4o$ (see FIG. 3A), provided with the outline parts having different densities along the boundary so as to increase the black difference between both sides of the boundary at which the expansion heights are different. In the normal image foaming bitmap data $4b_N$, the region of K60 which is the original black density $C_{KD}$ disappears at a narrow width part in the three-dimensional bitmap data $4o$ and the region R1 is only the outline part $R1_{rim2}$ of K80 and K70. Since this part is narrow in width, the expansion height is suppressed to a height equivalent to K60 although the density is K80 or K70. Similarly, the region of K10 which is the original black density $C_{KL}$ disappears at a narrow width part in the three-dimensional bitmap data $4o$, and the region R2 is only the outline part $R2_{rim}$ of K0 (white). Since this part is narrow in width and both sides are sandwiched by the outline part $R1_{rim2}$ of K80 in the region R1, the part is thermally expanded to a height equivalent to K10 by the heat diffused from the outline part $R1_{rim2}$.

(Mirroring Step)

In the mirroring step S2, the inversion processing unit 55 mirrors the normal image foaming bitmap data $4b_N$ to obtain the back-side foaming bitmap data 4b shown in FIG. 9. Since the normal image foaming bitmap data $4b_N$ is a normal image from the front side of the thermally expandable sheet 10, the data is mirrored to be printed on the back side. The generated back-side foaming bitmap data 4b is output by the back-side foaming bitmap data generating unit 5 and stored in the print database 4.

Figure 10A:
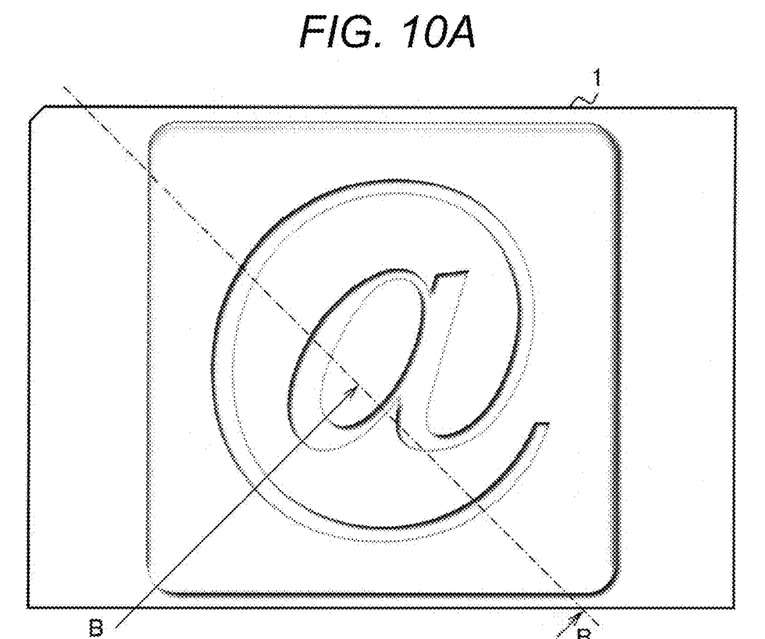
FIG. 10A is an appearance diagram of the front side.
Figure 10B:
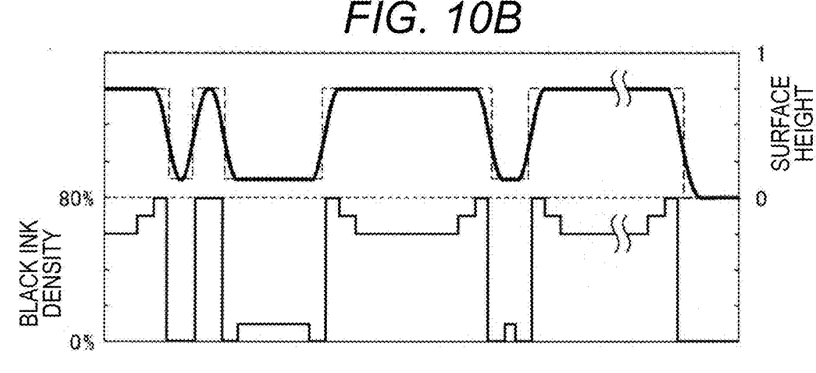
FIG. 10B is a graph showing the surface height at the cross section of the portion B-B of FIG. 10A and the photothermal conversion component density of a grayscale image printed on the back side.

By printing the grayscale image 2 on the back side of the thermally expandable sheet 10 based on the back-side foaming bitmap data 4b and projecting near infrared rays, the thermally expanding layer 11 is expanded and the surface rises to produce the three-dimensional image 1. The shape of the three-dimensional image will be described with reference to FIGS. 10A and 10B. FIGS. 10A and 10B are diagrams for explaining the appearance of the three-dimensional image according to the embodiment; FIG. 10A is an appearance diagram of the front side, and FIG. 10B is a graph showing the surface height at the cross section of the portion B-B of FIG. 10A and the photothermal conversion component density of the grayscale image printed on the back side. In FIG. 10B, similarly to FIG. 3B, the cross section of the three-dimensional image is enlarged and emphasized in the height direction. As shown in FIG. 10B, in the three-dimensional image 1, the surface has steep steps of irregularities, which are relatively close to the vertical, and the desired surface heights are obtained in the protruding and recessed regions if the regions are narrow. As described above, with the back-side foaming bitmap data 4b, it is possible to produce the three-dimensional image 1 having the surface shape in which the steps are relatively steep and the edges are sharp to be clear that there are the differences in height in the appearance by the grayscale image 2 printed on the back surface of the thermally expandable sheet 10, and the surface shape in which a desired height and depth are obtained if the protruding and recessed regions are narrow. Furthermore, with the back-side foaming bitmap data 4b, since a black ink pattern is not necessary to be printed on the front side of the thermally expandable sheet 10, it is possible to obtain a three-dimensional image 1 having a surface to which a clear image is added by printing an image pattern in desired colors, or a surface in white which is the ground color of the thermally expandable sheet 10. Moreover, since the three-dimensional image 1 is formed by printing and irradiating with near-infrared rays the grayscale image 2 only on the back side, that is, on one side of the thermally expandable sheet 10, alignment defects are hardly generated, less processes is required, and high productivity is obtained.

In the back-side foaming bitmap data 4b, the boundaries L1, L2, and L3 extracted from the three-dimensional bitmap data 4o in the boundary extracting step S10 are all closed curves, and the outline parts are also closed curves of widths $d_D$ and $d_L$, but the present invention is not limited thereto. For example, when the expansion height is continuously changed in a part between a region having a certain expansion height and an adjacent region having a different expansion height to incline the surface shape in design, no boundary is extracted from this part, the boundary to be extracted is a line segment or an open curve, and the outline part also has a shape corresponding to the boundary.

As described above, in the outline density correcting step S20, an outline part cannot be provided in the regions of black densities K80 and K0. Thus, when the black densities of the adjacent regions in the three-dimensional bitmap data 4o are K80 and K0, for example, in the case where the region R1 is K80 and the region R2 is K0, the step on the surface of the three-dimensional image cannot be steep, and the groove of the letter shape (region R2) is to be partially shallow. Therefore, when the adjacent regions are K0 and K80 or close thereto and the density of the outline part cannot be sufficiently corrected (for example, K0 and K70), the density of the entire region on the high density side is reduced, the density of the entire region on the low density area is increased, or both of them can be performed before the outline density correcting step S20. Thereafter, the outline density correcting step S20 is performed using the changed densities as $C_{KD}$ and $C_{KL}$. While the difference between $C_{KD}$ and $C_{KL}$ is kept at a certain value or more so that the sufficient differences in height are formed on the surface of the three-dimensional image, the change amount of the black density of the region is set so that, in the outline density correcting step S20, the density change amounts $\Delta C_{KD}$ and $\Delta C_{KL}$ of the outline parts are increased based on the minimum width of each of the two areas as the width is narrower.

In the generation of the back-side foaming bitmap data according to the embodiment, the mirroring step S2 is performed to the normal image foaming bitmap data $4b_N$ which is the data after the black density is adjusted (the density adjusting step S1). However, the three-dimensional bitmap data 4o may be mirrored and the density adjusting step S1 may be performed to the mirrored data. With regard to the three-dimensional bitmap data 4o, when the expansion height information is not expressed by the density of the black ink printed on the back side of the thermally expandable sheet and expanded to the height, for example, when the maximum height is expressed by black color (K100) or when the relation between the black density and the expansion height of the grayscale image 2 is nonlinear but linearly expressed, the process for converting the expansion height information into the black ink density is executed. More specifically, the back-side foaming bitmap data generating unit 5 is provided with an expansion height-black density converting unit (not shown), and before the density adjusting step S1 (boundary extracting step S10), the expansion height of the three-dimensional bitmap data 4o is converted into the black density based on the correlation of the black density with respect to the expansion height (the dependency of the expansion height on the black density) which is set to the unit in advance.

In the embodiment, the back-side foaming bitmap data 4b is generated based on the completed three-dimensional bitmap data 4o, but the back-side foaming bitmap data 4b may be directly generated in the working process for designing the three-dimensional bitmap data 4o. For example, the position, the shape, and the surface height of the three-dimensional image are designated, and simultaneously the normal image foaming bitmap data $4b_N$ for the region is generated to design the whole, thereafter the back-side foaming bitmap data 4b may be generated by mirroring the data.

As described above, according to the embodiment of the present invention, by printing with black ink and irradiating with near infrared rays a pattern only on the back side of a thermally expandable sheet, it is possible to obtain a three-dimensional image having a surface with a clear height difference and fine irregularities, and to which a clear image can be added. That is, it is possible to form desired irregularities without impairing coloration. The three-dimensional image thus formed (also called decorative shaping) can be used as a material for adding decorativeness to the surfaces of industrial products (for example, wall material, floor material, vehicle interior material, electronic devices, and the like).

The present invention is not limited to the above embodiment, and modifications can be made without departing from the scope of the present invention.

The invention claimed is:

1. A three-dimensional image forming system that expands a front side of a thermally expandable sheet formed by laminating a thermally expanding layer on a base material and that forms irregularities in a desired area, the three-dimensional image forming system comprising:
   a print data density adjusting unit configured to adjust, in print data for printing, on a back side of the thermally expandable sheet, a grayscale image for expanding the thermally expandable sheet to a surface height according to a density, a density of an outline part obtained by setting a region from a boundary between an adjacent two regions having different densities in the grayscale image to a predetermined distance from the boundary in at least one of the two regions such that steep steps are formed on the front side of the thermally expandable sheet at the boundary.

2. The three-dimensional image forming system according to claim 1, wherein the print data density adjusting unit is configured to adjust the density of the outline part in the region on a high density side of the two regions in the grayscale image to a high density.

3. The three-dimensional image forming system according to claim 1, wherein the print data density adjusting unit is configured to change the density of the outline part in the region on a low density side of the two regions in the grayscale image to a low density.

4. The three-dimensional image forming system according to claim 1, wherein the print data density adjusting unit is configured to change the density of the outline part in the region on a high density side of the two regions in the grayscale image to a high density, and to change the density of the outline part in the region on a low density side to a low density.

5. The three-dimensional image forming system according to claim 1, wherein the print data density adjusting unit is configured to change the density of the outline part to be different according to a distance from the boundary between the two regions, and to increase a density change amount as the outline part is closer to the boundary.

6. The three-dimensional image forming system according to claim 1, wherein the print data density adjusting unit is configured to move the outline part and the boundary between the two regions at which the outline part is provided by a predetermined distance to one side of the two regions.

7. The three-dimensional image forming system according to claim 1, wherein the outline part is at least one line having a width of the predetermined distance along the boundary between the two regions, and includes a line segment and/or a curve, or a closed line of a line segment and/or a curve.

8. The three-dimensional image forming system according to claim 1, further comprising a printing unit configured to print the grayscale image with ink containing a photothermal conversion material on the back side of the thermally expandable sheet using the print data in which the density is adjusted by the print data density adjusting unit.

9. The three-dimensional image forming system according to claim 1, further comprising a forming unit configured to irradiate the thermally expandable sheet on which the grayscale image is printed by the printing unit with light, to expand the thermally expanding layer, and to form irregularities.

10. A non-transitory computer-readable recording medium that stores a program causing a computer for a three-dimensional image forming system to execute the processes comprising:
    a print data density adjusting process for adjusting, in print data for printing, on a back side of a thermally expandable sheet formed by laminating a thermally expanding layer on a base material, a grayscale image for expanding the thermally expandable sheet to a surface height according to a density, a density of an outline part obtained by setting a region from a boundary between an adjacent two regions having different densities in the grayscale image to a predetermined distance from the boundary in at least one of the two regions such that steep steps are formed on a front side of the thermally expandable sheet at the boundary.

11. The computer-readable recording medium according to claim 10, wherein the density of the outline part in the region on a high density side of the two regions in the grayscale image is changed to a high density in the print data density adjusting process.

12. The computer-readable recording medium according to claim 10, wherein the density of the outline part in the region on a low density side of the two regions in the grayscale image is changed to a low density in the print data density adjusting process.

13. The computer-readable recording medium according to claim 10, wherein, in the print data density adjusting process, the density of the outline part in the region on a high density side of the two regions in the grayscale image is changed to a high density, and the density of the outline part in the region on a low density side is changed to a low density.

14. The computer-readable recording medium according to claim 10, wherein, in the print data density adjusting process, the density of the outline part is changed to be different according to a distance from the boundary between the two regions, and a density change amount is increased as the outline part is closer to the boundary.

15. The computer-readable recording medium according to claim 10, wherein the outline part and the boundary between the two regions at which the outline part is provided are moved by a predetermined distance to one side of the two regions in the print data density adjusting process.

16. The computer-readable recording medium according to claim 10, wherein the outline part is at least one line having a width of the predetermined distance along the boundary between the two regions, and includes a line segment and/or a curve, or a closed line of a line segment and/or a curve.

17. A three-dimensional structure comprising a foaming layer having irregularities laminated on a front side on a base material, on a back side of which a grayscale image containing a photothermal conversion component that converts absorbed light into heat is formed, wherein
    in the grayscale image, an outline part having a range from a boundary to a predetermined distance from the boundary has a photothermal conversion component density different from an outside of the outline part in at least one of two regions defining a steep step on a surface of the front side of the thermally expandable sheet as the boundary, and
    wherein the outline part in a region on a high surface height side of the boundary has a higher density.

* * * * *